US011981535B2

(12) United States Patent
Birrer

(10) Patent No.: US 11,981,535 B2
(45) Date of Patent: May 14, 2024

(54) VIBRATION STABILIZER FOR AN INFORMATION CARRIER

(71) Applicant: Inventio AG, Hergiswil (CH)

(72) Inventor: Eric Birrer, Buchrain (CH)

(73) Assignee: INVENTIO AG, Hergiswil (CH)

( * ) Notice: Subject to any disclaimer, the term of this patent is extended or adjusted under 35 U.S.C. 154(b) by 1444 days.

(21) Appl. No.: 16/332,835

(22) PCT Filed: Sep. 20, 2017

(86) PCT No.: PCT/EP2017/073711
§ 371 (c)(1),
(2) Date: Mar. 13, 2019

(87) PCT Pub. No.: WO2018/060020
PCT Pub. Date: Apr. 5, 2018

(65) Prior Publication Data

US 2019/0367323 A1 Dec. 5, 2019

(30) Foreign Application Priority Data

Sep. 30, 2016 (EP) .................................... 16191711

(51) Int. Cl.
*B66B 1/34* (2006.01)
*B66B 7/02* (2006.01)

(52) U.S. Cl.
CPC ............ *B66B 1/3492* (2013.01); *B66B 7/027* (2013.01)

(58) Field of Classification Search
CPC .............................. B66B 1/3492; B66B 7/027
See application file for complete search history.

(56) References Cited

U.S. PATENT DOCUMENTS 4,750,592 A * 6/1988 Watt ...................... B66B 1/3492 187/394
6,283,253 B1 * 9/2001 Folli ......................... B66B 1/50 187/394
9,352,934 B1 5/2016 Lee
(Continued)

FOREIGN PATENT DOCUMENTS

CN 1840461 A 10/2006
CN 102020150 A 4/2011
CN 105873844 A 8/2016
(Continued)

*Primary Examiner* — Jeffrey Donels
(74) *Attorney, Agent, or Firm* — William J. Clemens; Shumaker, Loop & Kendrick, LLP

(57) ABSTRACT

An elevator system vibration stabilizer device retains an information carrier extending through an elevator shaft at at least one point of the information carrier and includes a retaining element and a clamping element according to an assembly method. The clamping element is connected to the information carrier at the at least one point by a clamping force transmission device whereby the information carrier is applied with a clamping force against at least one contact region on the retaining element. The retaining element is stationary in the elevator shaft. A magnet element is an alternative to the clamping force transmission device. The vibration stabilizer device is included in an elevator system shaft information system to provide a method for preventing vibrations of the information carrier.

17 Claims, 5 Drawing Sheets

(56) References Cited

U.S. PATENT DOCUMENTS 9,469,501 B2 10/2016 Lee

FOREIGN PATENT DOCUMENTS

| | | | |
|---|---|---|---|
| EP | 0992449 | A1 | 4/2000 |
| EP | 1813564 | B1 | 2/2010 |
| FR | 2152404 | A1 | 4/1973 |
| JP | H0248389 | A | 2/1990 |

* cited by examiner

VIBRATION STABILIZER FOR AN INFORMATION CARRIER

FIELD

The present invention relates to an elevator system having an information carrier which extends through an elevator shaft of the elevator system and on which information is stored in a suitable manner. Such information can be detected by a detection device connected to the elevator car of the elevator system. For example, a position of the elevator car in the elevator shaft can be determined with a high degree of accuracy from the detected information. The information can be detected, for example, magnetically, optically or with the aid of ultrasound.

BACKGROUND

An information system which allows precise determination of a position of the elevator car in the elevator shaft (travelling shaft) is advantageous for an elevator system. For example, coded magnetic tapes, strips with optical markings or codes which can be detected using ultrasonic sensors can be used for this. To detect the information stored on the information carrier and to determine the position of the elevator car, a detection device, in particular a reader, is preferably guided along as close to the information carrier as possible.

A fastening device for shaft information transmitters of an elevator system is known from EP 0 992 449. In this case, shaft information transmitters are arranged at different height positions on multiple cables extending over a total shaft height. A sensor unit which can detect the shaft information transmitter is arranged on the car. The cables are fixed in position on a retaining rail to prevent cable vibrations. Such a vibration-stabilizing fastening is suitable if the sensor unit can tolerate relatively large variations in position between the shaft information transmitter and the sensor unit.

A device for generating shaft information is known from EP 1 813 564 B1. In this case there are a code carrier which extends over the conveying height of an elevator car and a device arranged on the elevator car for reading and evaluating the code, the device for reading and evaluating the code being arranged in a housing, and the code carrier being guided by means of a sliding guide in the housing. When the elevator car moves, the code carrier slides in the sliding guide past the device for reading and evaluating the code.

In one design known from EP 1 813 564 B1, the code carrier is held and tensioned at both ends so that it runs as vertically as possible through the elevator shaft. In this case, it is known to arrange a boom on a guide rail of the elevator car, to which one end of the code carrier is fixed while the other end of the code carrier is fixed in the shaft pit in a comparable manner. This results in the problem that such a code carrier or information carrier can be excited to vibrate in the elevator shaft. Furthermore, the strip can twist in opposite directions along the longitudinal axis thereof in the sections situated above and below a detection device or read head. Since in particular a strip-shaped information carrier must have a certain orientation at the read head, such twisting can impair fault-free and precise reading of the information. The mentioned problems arise particularly in high elevator systems and increase as the height of the elevator system increases. For example, vibrations of the information carrier in correspondingly high elevator systems can cause the information carrier to strike adjacent devices or a shaft wall, which can result in damage to the information carrier and noise.

SUMMARY

An object of the invention is to specify a device for an elevator system which is used to retain an information carrier extending through an elevator shaft of the elevator system, a shaft information system for an elevator system having such a device, and a method for preventing vibrations of an information carrier of an elevator system, which allow improved arrangement of the information carrier in the elevator shaft, and preferably allow vibrations and/or twisting of the information carrier in opposite directions over the length of the information carrier to be impeded or completely prevented and allow a reader to be guided along as close to the information carrier as possible. An object of the invention is also to specify a method for mounting such a device.

Solutions and proposals for corresponding devices, for a shaft information system, for a method for preventing vibrations of an information carrier of an elevator system and for a method for mounting such a device, which achieve the stated objects at least in part, are presented below. Advantageous additional or alternative developments and embodiments are also specified.

In one possible solution, a device, in particular a vibration stabilizer, for an elevator system is proposed, in which the device is used to retain an information carrier extending through an elevator shaft of the elevator system, at least at one point of the information carrier, there being at least one retaining element and at least one clamping element. The retaining element can be positioned in the elevator shaft in an at least substantially stationary manner. The clamping element can also be connected to the information carrier at one point of the information carrier; the clamping element can be clamped such that the information carrier is loaded with a clamping force against at least one contact region provided on the retaining element. The clamping force designed in this manner means that the information carrier can be guided close past a detection device on passing through same; if necessary, the detection device can lift the information carrier away from the contact region of the retaining element, and the clamping element can again clamp at the contact region after the information carrier has passed through the detection device. Substantially stationary in the elevator shaft is achieved, for example, by fastening the retaining element to guide rails, for example. Since the guide rails can, depending on the design of the building, undergo slight displacements relative to the building, the term substantially stationary does not mean absolutely fixed but stationary in the context of usual elasticities and displacements.

Preferably, the clamping element can be connected to the information carrier by means of at least one clamping force transmission means so that the clamping force is transmitted from the clamping element via the clamping force transmission means to the information carrier. The clamping element can thus be made geometrically independent of a connection to the information carrier.

In a further solution, a device, in particular a vibration stabilizer, for an elevator system is proposed, in which the device is used to retain an information carrier extending through an elevator shaft of the elevator system, at least at one point of the information carrier, there being at least one retaining element and at least one magnetic element. The retaining element can be positioned in the elevator shaft in an at least substantially stationary manner. The information carrier is permanently magnetized and/or can be magnetized by the magnetic element, in particular is ferromagnetic, at least at one point; the information carrier, when in the mounted state, is loaded by the magnetic element with a magnetic force of the magnetic element against at least one contact region provided on the retaining element. The ferromagnetic material can be a sheet metal strip or ferromagnetic particles which are embedded in a plastic layer of the information carrier. The same effect is achieved here as described in connection with the previous possible solution.

According to a further solution, a shaft information system for an elevator system is proposed in which there are an information carrier, a detection device which can be connected to an elevator car and is used to detect information stored on the information carrier, and at least one of the proposed devices.

Also proposed is a method for preventing vibrations of an information carrier of an elevator system, in which the information carrier is retained in the elevator shaft by at least one proposed device at least at one point of the information carrier.

A method for mounting a proposed device on an elevator system in which an information carrier extends through an elevator shaft of the elevator system is also proposed, wherein the retaining element is positioned in the elevator shaft in an at least substantially stationary manner, the clamping force transmission means is connected to the information carrier at one point of the information carrier, and the clamping element is tensioned such that the information carrier is loaded with a clamping force via the clamping force transmission means against at least one contact region provided on the retaining element. This proposed solution thus relates to a device in which a retaining element and at least one clamping element and, if required, a clamping force transmission means are provided.

It is advantageous that the clamping force transmission means is designed such that it can be guided through a through-opening formed in the information carrier, and that a head is formed at one end of the clamping force transmission means, via which head the clamping force transmission means can be connected to the information carrier at the point of the information carrier, owing to the clamping force. In this embodiment, the clamping force transmission means pulls, by its head, the information carrier to a certain extent against the at least one contact region of the retaining element, producing at least a frictional connection.

A cross-section or a diameter of the through-opening in the information carrier is of course matched to the type of clamping force transmission means. What is known as a "piano wire" can be used as the clamping force transmission means, for example. This is a thin, strong steel wire of 0.5 to 1.5 mm in diameter, for example. The clamping force transmission means is selected such that the information present on the information carrier is not distorted. In the case of a magnetically coded information carrier, this can be achieved, as defined above, by using a steel wire which is as thin as possible. Alternatively, a clamping force transmission means of non-magnetizable material such as copper, aluminum or plastic can be used.

A corresponding through-opening in the information carrier can be provided in different types. The information carrier can, for example, be provided with a series of through-openings in a manufacturing plant. A punching tool is advantageously used for this. In the process, a through-opening is punched at short intervals, for example every 100 mm. When mounting in the elevator system, a fitter selects one of the through-openings and places the vibration stabilizer such that it fits with this selected through-opening. Alternatively, the through-opening can also be provided directly by the fitter during installation. Hole punch pliers can be used for this, by means of which the through-opening is produced at the desired point on site. In the process, the fitter fastens the vibration stabilizer at the desired point and then makes the through-opening in the information carrier.

To fasten the clamping force transmission means to the information carrier, however, additional or different connection measures can also be provided, depending on the design. For example, the clamping force transmission means can have, at least in the region of the end thereof or in the vicinity of the head, a crimp connection to the information carrier. During mounting, the clamping force transmission means can be pressed by one end into the through-opening, for example, the head forming the stop for the pressing. When, for example, the through-opening widens owing to material fatigue over the service life, a reliable connection is still ensured via the head and thanks to the clamping force. In modified embodiments, other connections can also be implemented between the clamping force transmission means and the information carrier. For example, the clamping force transmission means can also be connected to the information carrier by a screw connection or rivet connection.

In one possible embodiment, the clamping force transmission means is advantageously designed at least substantially as a tensioning wire. In this case, the clamping force transmission means can in particular have at least one head and/or be suitably formed at least at one end to allow a connection to the information carrier and to the clamping element. In this case, it is also possible for the clamping force transmission means to have one or two end pieces which are connected to the tensioning wire. An advantageous design of the clamping force transmission means in relation to the application can be implemented thereby.

It is also advantageous for a first contact region and a second contact region to be provided on the retaining element, for the retaining element to have a through-opening through which the clamping force transmission means runs from the clamping element on one side to the information carrier on the other side when in the mounted state, and for the through-opening of the retaining element to be provided between the first contact region and the second contact region. This produces an advantageous arrangement in which the information carrier can be lifted off from the retaining element, for example by a read head, during operation when the read head passes through the retaining element owing to the movement of the elevator car through the elevator shaft. After the retaining head has moved sufficiently far away from the retaining element, the information carrier is then applied to the contact regions of the retaining element again by the clamping force of the retaining element. In this case, the read head has a suitable cut-out in the direction towards the retaining element so that the clamping force transmission means, in particular a tensioning wire, can be correspondingly guided through.

It is also advantageous for a first lateral retaining bar and a second lateral retaining bar to be provided on the retaining element, and for the information carrier, in the mounted state, to be arranged at least between the first lateral retaining bar and the second lateral retaining bar when the information carrier bears against the at least one contact region. In particular, the information carrier can bear against two contact regions between which a through-opening is situated. When the retaining element has a through-opening, it is also advantageous for the clamping force transmission means to run from the clamping element on one side to the information carrier on the other side when in the mounted state, and for the through-opening of the retaining element to be provided between the first lateral retaining bar and the second lateral retaining bar. In such embodiments, it can in particular be made possible for the information carrier to be lifted off from the retaining element, in particular the contact regions of the retaining element, when a read head or the like passes through the retaining element. The lateral retaining bars then ensure reliable positioning within greater or lesser predefined tolerances when the information carrier is pulled back against the retaining element, in particular the contact regions of the retaining element. A possible function of the retaining bars consists in that lateral movement limitation for the information carrier is ensured by the retaining bars when vibrations of the information carrier are excited during operation, for example. Together with the clamping force, a point-precise positioning or fixing of the information carrier at a point between the ends thereof, which are generally fixed anyway, in relation to the overall dimensions of the elevator system can then be ensured. Depending on the application, in particular the height of the elevator system and thus the length of the information carrier, the measure can be repeated multiple times so that any vibrations of the information carrier which are excited cannot continue over the entire length of the information carrier, a high level of damping of such vibrations is ensured, and possible deflections, in particular horizontal deflections, of the information carrier out of the ideal rest position thereof are considerably limited.

Preferably, the through-opening of the retaining element is shaped such that the information carrier or the connection point thereof at which the clamping force transmission means or the clamping element is connected to the information carrier can be displaced vertically to the retaining element, that is to say along a longitudinal extent of the information carrier. Length differences between the information carrier and the surrounding structure can be compensated thereby. Such length differences can arise, for example, by settling processes in the building or else by thermal influences.

Moreover, it is advantageous for the clamping element to be tensionable such that the information carrier, when in the mounted state, can be lifted off from the contact region of the retaining element at least approximately counter to the clamping force by a detection device which is used to detect information stored on the information carrier. This allows a largely inelastic design of the clamping force transmission means along the effective direction thereof; elastic and/or plastic bending can be possible in particular with a design at least substantially as a tensioning wire. The clamping element can then allow a range of movement for the information carrier which ensures the lifting off necessary during operation.

It is advantageous for the clamping element to have a clamping bracket, for example a leaf spring, and for the clamping force transmission means to be connected to the clamping bracket when in the mounted state such that a minimum effective clamping force is set via the length of the clamping force transmission means between the information carrier and the clamping bracket. This minimum effective clamping force is the clamping force which is effective when the information carrier bears against the retaining element, in particular at least one contact region of the retaining element. If, for example, a read head or the like passes through the retaining element, the clamping bracket can be tensioned further owing to the lifting off of the information carrier from the retaining element, so that the clamping force effective during the passage is correspondingly greater. After the passage, the information carrier is then held against the retaining element with the minimum effective clamping force which is set. The minimum effective clamping force is specified such that vibrations continuing over the length of the information carrier are prevented or at least substantially damped. Depending on the application, the minimum effective clamping force can be set such that it is approximately 2 N, for example.

It is also advantageous for a connection piece also to be provided, and for the clamping bracket and the retaining element to be connected to the connection piece when in the mounted state. In this case, it is also advantageous for at least one fastening clip to be provided, which can be fastened to a rail of the elevator system, and for the connection piece to be fastenable to the rail at least indirectly, in particular by means of a supporting arm, via the at least one fastening clip. Specifically, two fastening clips can be provided, which grip a foot of the rail of the elevator system on opposite sides, for example. In this manner, the connection piece can be positioned in a stationary manner at a suitable point in the elevator shaft. The arrangement with the retaining element and the clamping bracket which are connected to the connection piece can be mounted reliably and simply in the elevator shaft in this manner.

Alternatively, the clamping element can be in the form of a spring or tension spring, for example, which is connected to the information carrier directly or indirectly by means of the clamping force transmission means at one end and to the connection piece at the other end. The connecting parts are then designed such that the spring pulls the information carrier to the retaining element.

It is self-evident that suitable modifications are conceivable. For example, the connection piece can also be mounted in the elevator shaft in a different way. For example, the connection piece can also be connected directly or indirectly to a suitable supporting structure which is used to fasten rails in the elevator shaft, for example. In this case, a supporting arm can likewise be used to allow indirect fastening of the connection piece to such a supporting structure or the like. The information carrier is not necessarily part of the device, in particular of the vibration stabilizer. In particular, the device with the retaining element, the clamping element and the clamping force transmission means can also be produced and marketed independently of such an information carrier.

In a shaft information system for an elevator system which has at least a device and an information carrier and a detection device used for detecting information stored on the information carrier, it is advantageous for the detection device to have a guiding structure which is used to lift off the information carrier from the contact region of the retaining element when the detection device is guided along the information carrier in the region of the retaining element during operation, and for the guiding structure to have a cut-out facing the retaining element. In this case, several suitable embodiments are conceivable. In one possible embodiment, the guiding structure can have two side pieces which are pivotable towards each other and are connected to each other via a back which is flexible at least at one point or overall. For mounting, this guiding structure can be removed from the detection device and opened by bending the back such that the information carrier can be inserted. In a further possible embodiment, the guiding structure has two separate side pieces which bear end-to-end against each other on the rear of the guiding structure when they are inserted at a receptacle of the detection device. By removal of at least one side piece, the information carrier can then be introduced between the side pieces which are subsequently placed back into the receptacle. In a further possible embodiment, the guiding structure can have two side pieces which are separate from each other and can be inserted into a receptacle of the detection device separately from each other and in an interlocking manner. In this embodiment, the side pieces can be held in their position in an interlocking manner in the mounted state without necessarily touching each other. It is then possible to insert the information carrier by removing one or both side pieces.

Specifically in a method for mounting a device, it is advantageous if a detection device is provided which is connected to an elevator car and is used to detect information stored on the information carrier. It is also advantageous if one side piece of a guiding structure of the detection device is pivoted relative to the other side piece in order to insert the information carrier into the guiding structure. At least one side piece can also be temporarily dismounted to insert the information carrier into the guiding structure. This allows advantageous mounting of the detection device.

DESCRIPTION OF THE DRAWINGS

Preferred exemplary embodiments of the invention are explained in more detail in the description below with reference to the attached drawings. In the figures.

DETAILED DESCRIPTION

Figure 1:
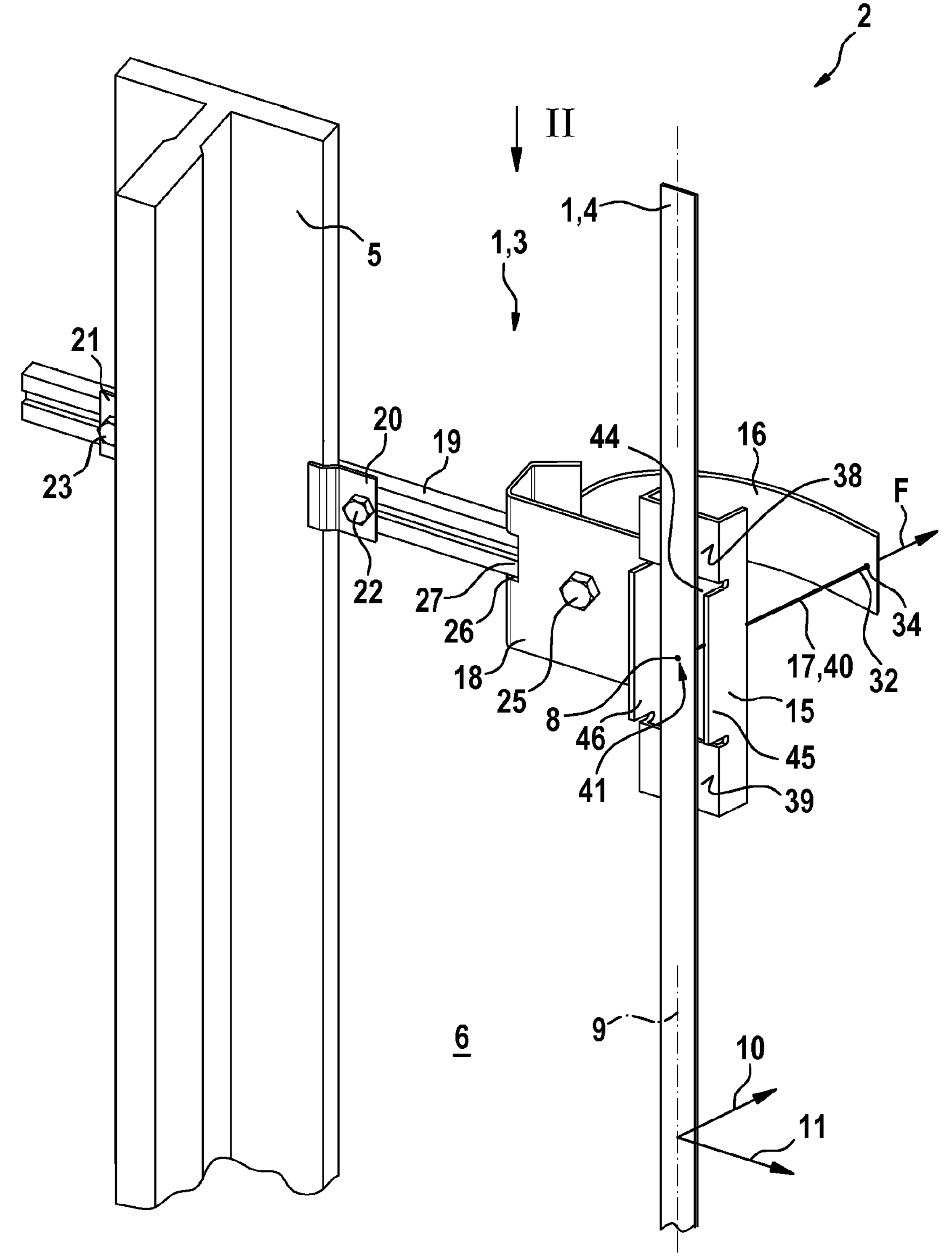
FIG. 1 shows a shaft information system for an elevator system with a device for retaining an information carrier which is fastened to a rail of the elevator system, according to an exemplary embodiment of the invention in a three-dimensional and schematic detail diagram.
Figure 2:
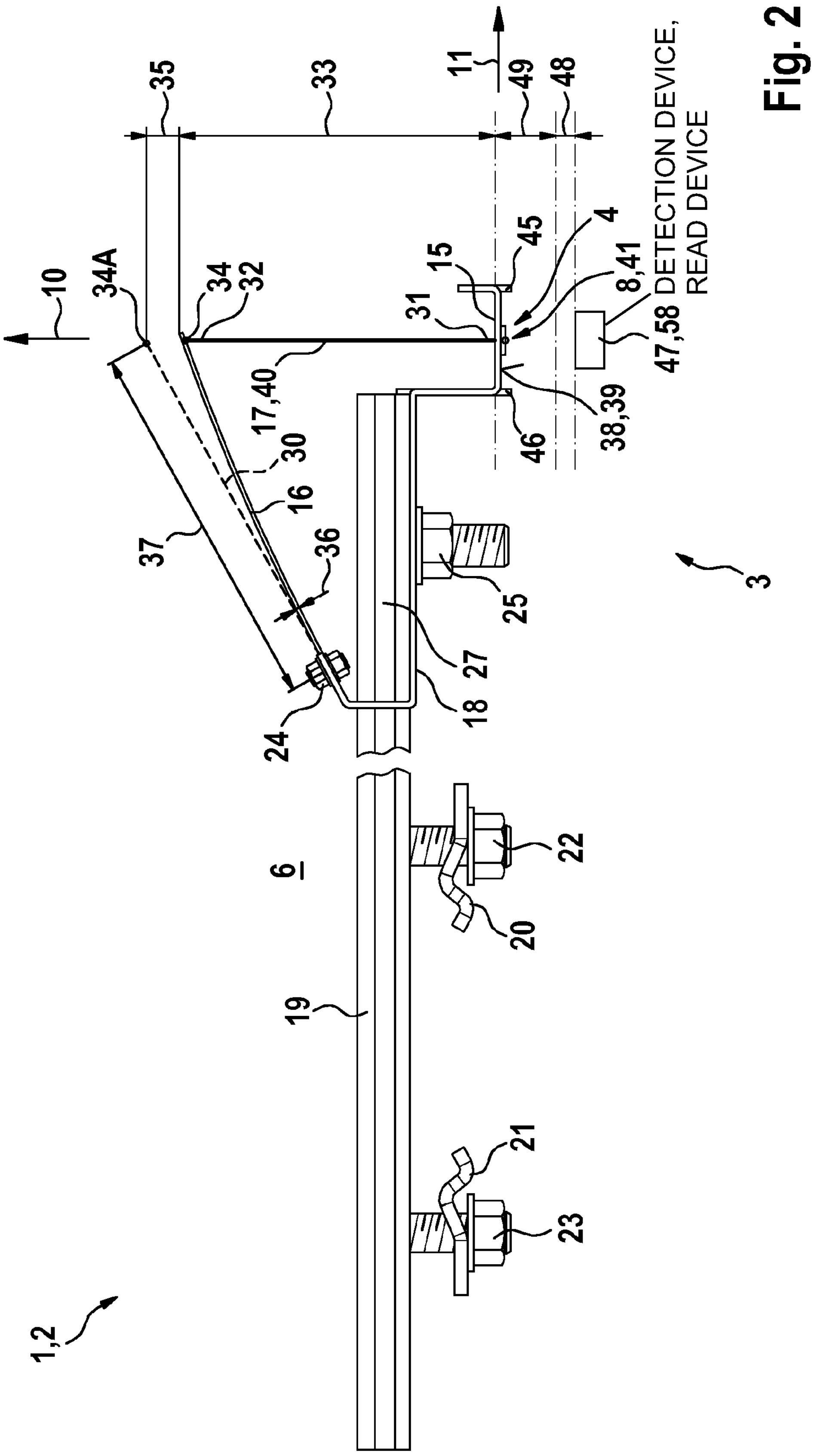
FIG. 2 shows the device shown in FIG. 1 for retaining the information carrier in a schematic detail diagram from the viewing direction indicated with II.

First, a shaft information system 1 for an elevator system 2 (FIG. 7) having a device 3 and information carrier 4 according to an exemplary embodiment of the invention is described using FIGS. 1 and 2. FIG. 1 shows the shaft information system 1 for the elevator system 2 with the device 3 for retaining an information carrier 4 which is fastened to a rail 5 of the elevator system 2, according to the exemplary embodiment of the invention in a three-dimensional and schematic detail diagram. FIG. 2 shows the device 3 shown in FIG. 1 for retaining the information carrier 4 in a schematic detail diagram from the viewing direction indicated with II. The information carrier 4 is part of the shaft information system 1 but not necessarily part of the device 3 which is used to retain the information carrier 4. This means that the device 3 can also be produced and marketed and mounted during erection of the elevator system 2 independently of the information carrier 4. Furthermore, a device 3 can also be suitable for differently designed information carriers 4.

The information carrier 4 is mounted in an elevator shaft 6 of the elevator system 2 such that it extends at least substantially through the entire elevator shaft 6 of the elevator system 2. The information carrier 4 can for example be connected to a shaft floor 7 and clamped vertically upwards against same.

The operating principle of the device 3 consists in retaining the information carrier 4 extending through the elevator shaft 6 at a point 8 of the information carrier 4. Vibrations of the information carrier 4 which can occur perpendicular to a predefined extent 9 of the information carrier 4 through the elevator shaft 6 should be substantially prevented or at least reduced by this retention. To simplify the description, directions (transverse directions) 10, 11 which are perpendicular to each other and perpendicular to the predefined extent 9 are considered here.

The device 3 has a retaining element 15, a clamping element 16, a clamping force transmission means 17, a connection piece 18, a supporting arm 19, a first fastening clip 20 and a second fastening clip 21. The individual parts 15 to 21 of the device 3 can be provided once or multiple times depending on the design of the device 3.

In this exemplary embodiment, the connection piece 18 is fastened to the rail 5 of the elevator system 2 by means of the supporting arm 19 via the two fastening clips 20, 21. In a modified design, the supporting arm 19 can also be connected to the rail 5 via a possibly modified single fastening clip 20. Furthermore, a modification is conceivable in which the connection piece 18 is connected to the rail 5 via two supporting arms 19 and in each case one or two fastening clips 20, 21.

Fastening means 22, 23 which are used to fasten the fastening clips 20, 21 to the supporting arm 19 are in the form of screw-fastenings 22, 23 in this exemplary embodiment. When the device 3 is mounted, the screw-fastenings 22, 23 are tightened to produce a frictional fit with the rail 5. The fastening clips 20, 21 can be elastically deformable here.

The connection piece 18 ensures a connection between the clamping element 16 and the retaining element 15, which allows tensioning of the clamping element 16 relative to the retaining element 15 so that a clamping force F is applied. In this exemplary embodiment, the clamping force F is parallel to the direction 10. Several variants are conceivable here. For example, the retaining element 15, the clamping element 16 and the connection piece 18 are formed in one piece, for example from a metal sheet. A design is also conceivable in which the retaining element 15, the clamping element 16 and the connection piece 18 are each formed in one piece, wherein the clamping element 16 is connected to the connection piece 18, and the retaining element 15 is connected to the connection piece 18. Furthermore, the clamping element 16 and the connection piece 18 can be formed in one piece and connected to the retaining element 15.

In this exemplary embodiment, the clamping element 16 is connected to the connection piece 18 via a screw connection 24. In this exemplary embodiment, the retaining element 15 and the connection piece 18 are formed in one piece and connected to the supporting arm 19 via a screw connection 25.

The connection piece 18 has an opening 26 in the form of a punched hole 26 through which one end 27 of the supporting arm 19 extends and which is matched to the geometry of the supporting arm 19 in order to prevent rotation of the connection piece 18 about the screw connection 25 relative to the supporting arm 19.

The mounting of the clamping force transmission means 17 and the preloading of the clamping element 16 can take place in different ways. In one possible mounting process, the clamping element 16 is, after being fastened to the rail 5 via the connection piece 18 and the supporting arm 19, initially in its relaxed starting position, which is indicated by the dashed line 30. First, one end 31 of the clamping force transmission means 17 can be connected to the information carrier 4 at the point 8 of the information carrier 4. Then the other end 32 of the clamping force transmission means 17 can be connected to the clamping element 16. The length 33 of the clamping force transmission means 17 between its ends 31, 32 is predefined such that a fastening point 34 on the clamping element 16, at which the end 32 is connected to the clamping element 16, must be moved by a preloading distance 35 at least approximately along, in this case counter to, the direction 10. The fastening point of the clamping element 16 in the starting position 30 is indicated here with reference sign 34A. Strictly speaking, an arcuate movement occurs, so the movement of the fastening point 34A into the fastening point 34 takes place only partially or approximately along the direction 10.

The minimum effective clamping force F is predefinable via the predefined length 33. The selection of the material and the design of the clamping element 16, in particular its material thickness 36 and a distance 37 of the fastening points 34A and 34 from the screw connection 24, that is, the fastening 24 on the connection piece 18, which define the spring constant of the clamping element 16, have an effect on the clamping force F. Therefore, there are several possibilities for adapting the minimum effective clamping force F, that is, the clamping force F in the starting state and the rise in the clamping force on further deflection, to the application in question. The starting state means in this case the arrangement of the information carrier 4 directly on the retaining element 15, which means that the point 8 of the information carrier 4 is situated on the predefined extent 9 which is indicated here by a dash-dotted line 9.

The clamping force transmission means 17 can thus be connected to the information carrier 4 at the point 8 of the information carrier 4. Furthermore, the clamping element 16 can be tensioned such that the information carrier 4 is loaded with the clamping force F via the clamping force transmission means 17 against at least one contact region 38, 39 provided on the retaining element, the minimum effective clamping force F being set via the preloading distance 35. The retaining element 15 is positioned in the elevator shaft 6 in an at least substantially stationary manner.

In this exemplary embodiment, the clamping force transmission means 17 is designed substantially as a tensioning wire 40. The clamping force transmission means 17 also has a head 41 at the end 31. During mounting, the tensioning wire 40 is guided through a through-opening 42, in particular through-bore 42, formed in the information carrier 4 until the head 41 bears against a front 43 of the information carrier 4. The through-opening 42 and the front 43 of the information carrier 4 are indicated, inter alia, in FIG. 3A.

The clamping force transmission means 17 is thus designed such that it can be guided through the through-opening 42 formed in the information carrier 4. Furthermore, the head 41, via which the clamping force transmission means 17 can be connected to the information carrier 4 at the point 8 of the information carrier 4 owing to the clamping force F, is formed on the end 32 of the clamping force transmission means 17. This is because, owing to the clamping force F, the head 41 always bears against the front 43 of the information carrier 4, and therefore the clamping force transmission means 17 is suspended by the head 41 at the point 8 in the information carrier 4.

The retaining element 15 has a through-opening 44 which is situated between the first contact region 38 and the second contact region 39. Furthermore, the retaining element 15 has a first lateral retaining bar 45 and a second lateral retaining bar 46, the through-opening 44 being situated between the first lateral retaining bar 45 and the second lateral retaining bar 46. The clamping force transmission means 17 runs through the through-opening 44 when in the mounted state. The clamping force transmission means 17 runs from the clamping element 16 on one side to the information carrier 4 on the other side. When the information carrier 4 bears against the contact regions 38, 39, the information carrier 4 is situated between the two lateral retaining bars 45, 46 in the mounted state.

During operation, a certain guidance or movement limitation is ensured in this manner for the clamping force transmission means 17. The extending of the clamping force transmission means 17 through the through-opening 44 limits possible movements of the clamping force transmission means 17 and thus also of the point 8 of the information carrier 4. In particular, the information carrier 4 cannot jump behind the retaining element 15 as viewed in the direction 10. Moreover, the retaining bars 45, 46 ensure further positioning along the direction 11 when the information carrier 4 bears against the contact regions 38, 39. In the example, the through opening 44 is designed such that a vertical displacement of the information carrier 4 relative to the retaining element 15 is possible. The vertical displacement is a displacement along the extent 9 of the information carrier 4.

FIG. 2 schematically shows a possible position of a detection device 47. To detect the information stored on the information carrier 4 by the detection device 47, it is necessary in this exemplary embodiment for the information carrier 4 to be situated at least at a reading distance 48 from a read device 58 of the detection device 47. To achieve this, the information carrier 4 is moved over a distance 49 counter to the direction 10 and brought towards the read device 58 of the detection device 47. This takes place in relation to the position of the detection device 47 relative to the information carrier 4 viewed along the predefined extent 9, that is, in relation to the current height or position of an elevator car 80 (FIG. 7) in the elevator shaft 6.

If the detection device 47 is in the region of the retaining element 15, for example, the information carrier 4 is lifted locally from the contact regions 38, 39 of the retaining element 15, in order to ensure the reading distance 48 locally between the information carrier 4 and the detection device

47. When the detection device 47 has passed through the retaining element 15 and is sufficiently far away from the retaining element 15 viewed along the extent 9, the information carrier 4 bears back against the contact regions 38, 39 owing to the clamping force F. In this case, the lateral retaining bars 45, 46 can act as guides to limit any possible play for positioning the information carrier 4 along the direction 11.

The design of the clamping element 16 is matched to the distance 49 necessary for bringing the information carrier 4 towards the detection device 47. In this case, the clamping element 16 can be tensioned such that the information carrier 4 can be lifted from the contact regions 38, 39 of the retaining element 15 at least approximately counter to the clamping force F, that is, at least approximately counter to the direction 10, by the detection device 47; possible designs for ensuring the function of lifting and guiding the information carrier 4 are described in more detail using FIG. 3A to 5B.

In this exemplary embodiment, the clamping element 16 is in the form of a clamping bracket 16. In the starting state, greater or lesser bending of the clamping bracket 16 is produced depending on the length 33 of the tensioning wire 40 of the clamping force transmission means 17, as a result of which bending the minimum effective clamping force F is set.

Figure 3A:
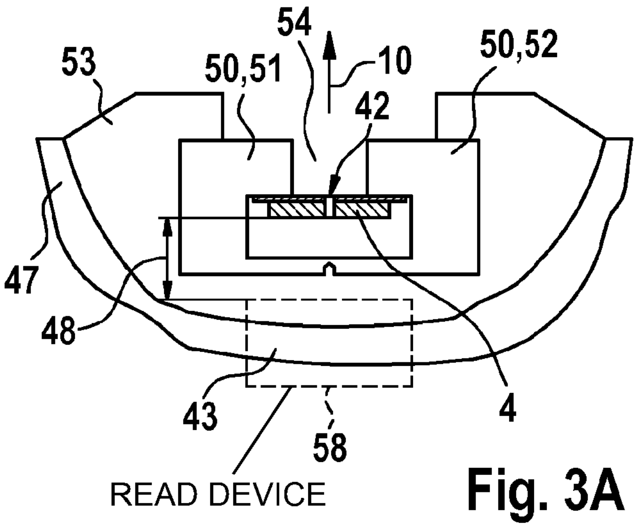
FIG. 3A shows a detection device of a shaft information system having side pieces for guiding the information carrier in a schematic detail diagram corresponding to a first possible design.

FIG. 3A shows a detection device 47 of a shaft information system 1 having a guiding structure 50 which has side pieces 51, 52, for guiding the information carrier 4 in a schematic detail diagram corresponding to a first possible design. The side pieces 51, 52 are connected to each other. The side pieces 51, 52 are inserted into a receptacle 53 in the detection device 47. This defines the position of the side pieces 51, 52 relative to each other. The side pieces 51, 52 of the guiding structure 50 leave a cut-out 54 exposed.

In the mounted state, the information carrier 4 is inserted into the guiding structure 50. Here, the clamping force F is applied to the information carrier 4 in the direction 10, as is described by way of example using FIGS. 1 and 2. The guidance of the information carrier 4 is implemented such that the information carrier 4 cannot be pulled out of the guiding structure 50 when in the mounted state. This is not possible even if the information carrier 4 is tilted or twisted along its extent 9.

Figure 3B:
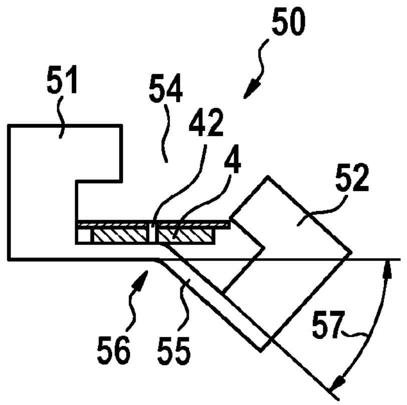
FIG. 3B shows the side pieces of the detection device shown in FIG. 3A during a mounting process for inserting the information carrier into the detection device.

FIG. 3B shows the side pieces 51, 52 of the detection device 47 shown in FIG. 3A during a mounting process for inserting the information carrier 4 into the detection device 47. In this design, the side pieces 51, 52 are connected to each other via a common back 55, which can be bent at one point 56 in this exemplary embodiment. In possible modifications, the back 55 can also be bendable at multiple points 56 or overall. As a result, the two side pieces 51, 52 are pivotable relative to each other, as shown here by an angle 57. For example, pivoting with an angle 57 of 40° can be made possible. In the pivoted state, the cut-out 54 between the side pieces 51, 52 is opened further to a certain extent so that the information carrier 4 can be inserted between the side pieces 51, 52. Then, the side piece 52 is pivoted back relative to the side piece 51 so that the angle 57 disappears. The guiding structure 50, together with the side pieces 51, 52, can then be inserted into the receptacle 53. This ensures reliable guidance of the information carrier 4 in the detection device 47.

The information carrier 4 guided through the guiding structure 50 can thereby be brought into the reading distance 48 in relation to a read device 58 of the detection device 47. For example, the read device 58 can be in the form of an optical read device which reads information stored on the information carrier 4. The position of the read device 58 in relation to the information carrier 4 is illustrated in FIG. 3A by a dash-dotted line. The guiding structure 50 and the read device 58 can be arranged suitably relative to each other. In particular, a vertical offset is possible. Suitable openings in the guiding structure 50 to allow optical reading of the information are also conceivable.

When the detection device 47 passes through the retaining element 15, the cut-out 54 means that the clamping force transmission element 17 does not hinder the movement of the detection device 47 relative to the retaining element 15.

The through-opening 42, in particular through-bore 42, in the information carrier 4 can also be made on site during mounting, if necessary. For example, hole punch pliers can be used to punch a small hole 42 to form the through-opening 42 in the information carrier 4. Then the clamping force transmission means 17, starting with its end 32, can be fed through the through-opening 42. At the end 31, the head 41 then hooks on the information carrier 4.

Figure 4A:
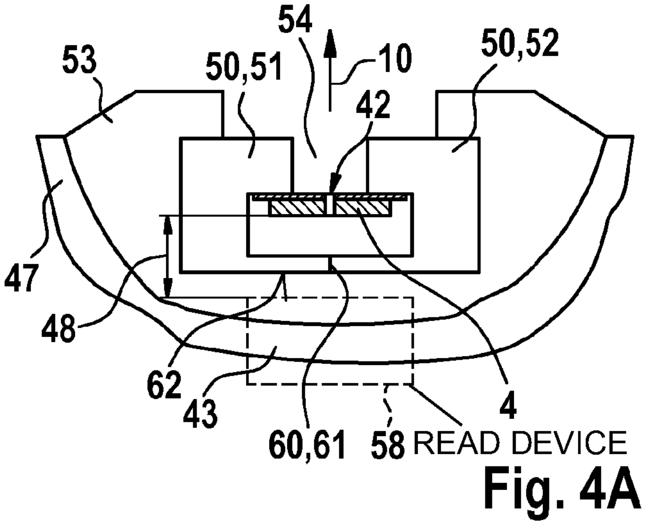
FIG. 4A shows a detection device of a shaft information system having side pieces for guiding the information carrier with a schematic detail diagram corresponding to a second possible design.

FIG. 4A shows a detection device 47 of a shaft information system 1 having side pieces 51, 52, for guiding the information carrier 4 in a schematic detail diagram corresponding to a second possible design. In this exemplary embodiment, an abutting face 60 is formed on the side piece 51. An abutting face 61 is also formed on the side piece 52. In this case, the side pieces 51, 52 are designed as separate side pieces 51, 52 and can thus be separated from each other, in principle. In the mounted state, in which the guiding structure 50, together with the side pieces 51, 52, is inserted into the receptacle 53, the abutting faces 60, 61 of the side pieces 51, 52 bear against each other.

Figure 4B:
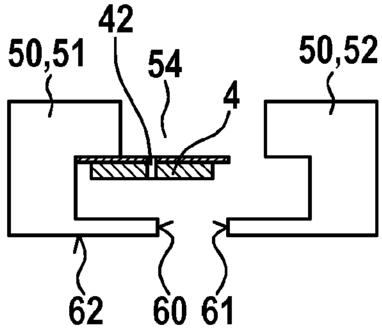
FIG. 4B shows the side pieces of the detection device shown in FIG. 4A during a mounting process for inserting the information carrier into the detection device.

FIG. 4B shows the side pieces 51, 52 of the detection device 47 shown in FIG. 4A during a mounting process for inserting the information carrier 4 into the detection device 47. In this case, the side pieces 51, 52 are separated from each other during the mounting process, so that the information carrier 4 can be inserted into the side pieces 51, 52, which are then joined together again. The side pieces 51, 52 are placed end to end at a rear 62 and then inserted into the receptacle 53.

Figure 5A:
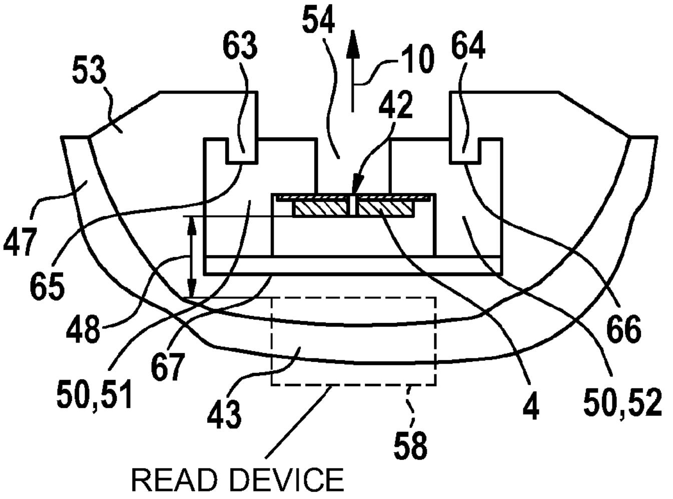
FIG. 5A shows a detection device of a shaft information system having side pieces for guiding the information carrier in a schematic detail diagram corresponding to a third possible design.

FIG. 5A shows a detection device 47 of a shaft information system 1 having side pieces 51, 52, for guiding the information carrier 4 in a schematic detail diagram corresponding to a third possible design. In this design, the side pieces 51, 52 of the guiding structure 50 are designed as side pieces 51, 52 which are separate from each other. The side pieces 51, 52 of the guiding structure 50 are also separated from each other when they are inserted into the receptacle 53. The positioning of the side pieces 51, 52 takes place in an interlocking manner. For example, noses 63, 64 are formed on the receptacle 53, which engage in corresponding grooves 65, 66 in the side pieces 51, 52 when in the mounted state. A rear wall 67 can be provided, depending on the design of the detection device 47. The rear wall 67 is in this case inserted into the receptacle 53 as a separate component. Suitable openings can then be formed in the rear wall 67, in case, for example, the information of the information carrier 4 should be read optically by means of a read device 58.

Figure 5B:
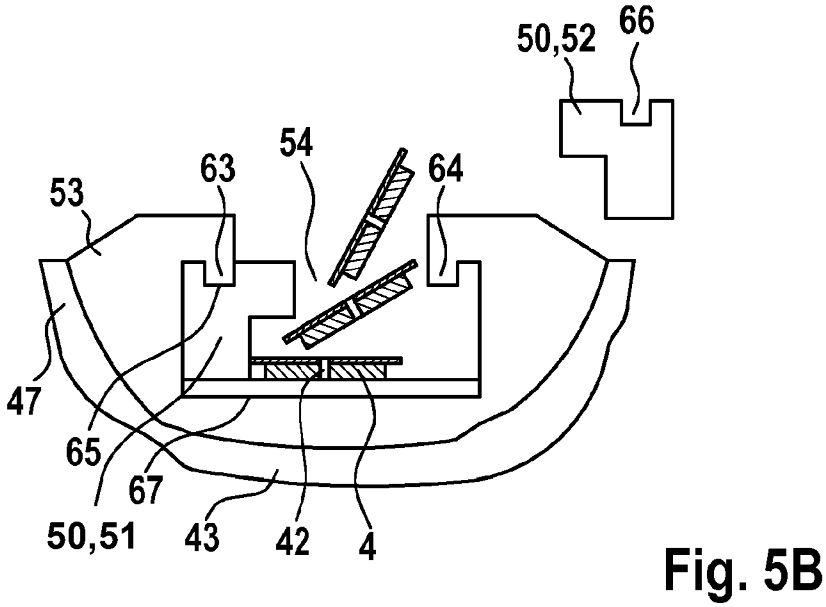
FIG. 5B shows the side pieces of the detection device shown in FIG. 5A during a mounting process for inserting the information carrier into the detection device.

FIG. 5B shows the side pieces 51, 52 of the detection device 47 shown in FIG. 5A during a mounting process for inserting the information carrier 4 into the detection device 47. In this case, at least one of the side pieces 51, 52 is removed from the receptacle 53. The information carrier 4 can thereby be inserted into the detection device 47. The at least one removed side piece 51, 52, in this case the side piece 52, is then inserted back into the receptacle 53. The two separated side pieces 51, 52 in this exemplary embodiment can thus be inserted into the receptacle 53 of the detection device 47 separately from each other and in an interlocking manner.

Figure 6:
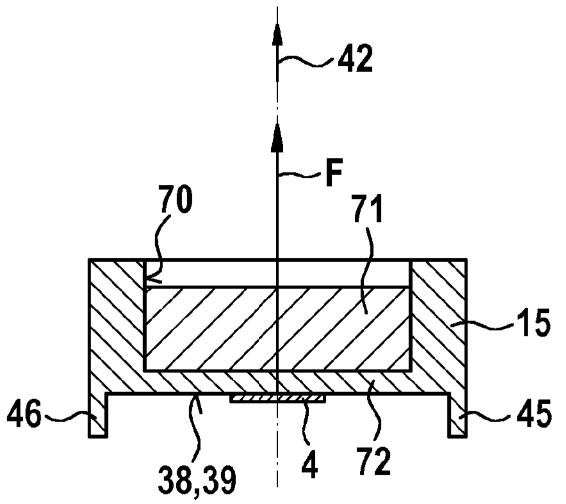
FIG. 6 shows a retaining element of a device for retaining an information carrier in a schematic sectional diagram according to a further exemplary embodiment of the invention, wherein the information carrier is retained by a magnetic force.

FIG. 6 shows a retaining element 15 of a device 3 for retaining an information carrier 4 in a schematic sectional diagram corresponding to a further exemplary embodiment of the invention, wherein the information carrier 4 is retained by a magnetic force F. In this exemplary embodiment, the retaining element 15 has a rear receptacle 70 into which a magnetic element 71 is inserted. The magnetic element 71 is fixed in the rear receptacle 70 in a suitable manner. In this exemplary embodiment, at least one bridge 72 is provided to prevent direct contact between the information carrier 4 and the magnetic element 71. The information carrier 4 is permanently magnetized and/or magnetizable by the magnetic element 71, that is, ferromagnetic, at least at the point 8. The magnitude of the magnetic force F is predefined so as to ensure that the information carrier 4 returns to the contact regions 38, 39 of the retaining element 15 after passing through the detection device 47, even if the information carrier 4 is lifted off from the contact regions 38, 39. As long as the information is stored on the information carrier 4 magnetically, magnetic shielding within a limited region can be implemented, if necessary, by a suitably designed bridge 72.

Figure 7:
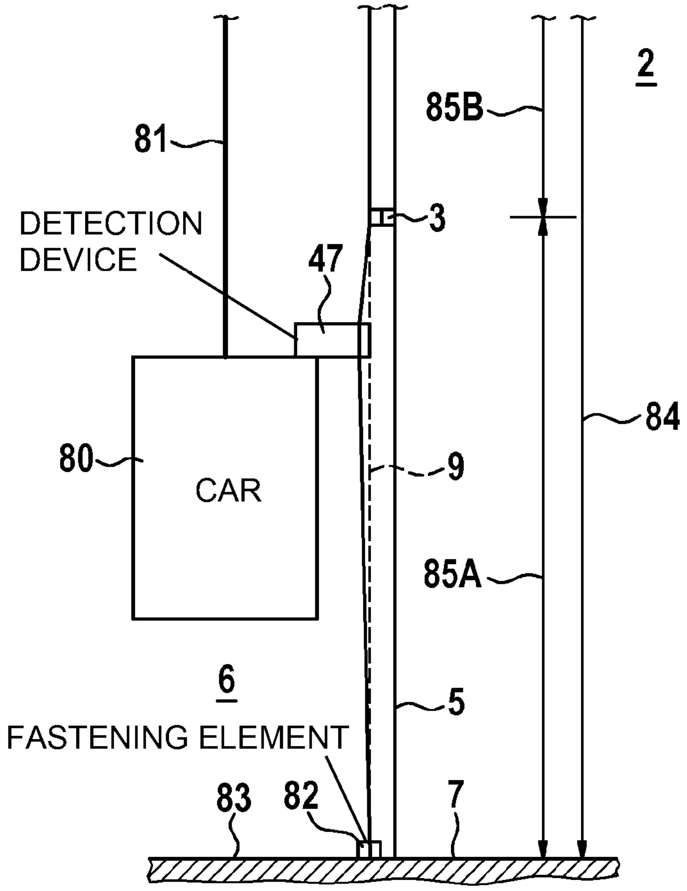
FIG. 7 shows an elevator system having a shaft information system in a schematic diagram to explain the invention.

FIG. 7 shows the elevator system 2 having a shaft information system 1 in a schematic diagram to explain the invention. The elevator system 2 has the elevator car 80, which is suspended from supporting means 81. The device 3 is connected to the rail 5. The information carrier 4 is fastened in the region of a shaft floor 83 of the elevator shaft 6 via a fastening element 82. In the tensioned state, the information carrier 4 extends at least substantially over a height 84 of the elevator shaft 6. The height 84 can be divided one or more times by the device 3 and by any other correspondingly designed devices. This produces partial heights 85A, 85B, at the ends of which fastening or retaining points are implemented. For example, a height 84 of 200 m can be divided into partial heights 85A, 85B and further partial heights of 50 m each. Three devices 3 are needed for this.

The guidance of the information carrier 4 in the detection device 47 along the extent 9 of the information carrier 4 is also illustrated. Here, the information carrier 4 is deflected somewhat out of the predefined extent 9. This deflection occurs within the partial heights 85A, 85B and when passing through a device 3. In the situation shown, the detection device 47 is still far enough away from the device 3 that the deflection of the information carrier 4 out of the predefined extent 9 only has an effect in the partial height 85A.

The detection device 47 allows additional guidance of the information carrier 4 so that, for example, the information carrier 4 does not twist. The read device 58 can then be guided close to the information carrier 4 to allow fault-free and precise reading of the information. The information carrier 4 is then stabilized and guided in the reading region, inter alia.

Possible excitations which can excite the information carrier 4 to vibrate are prevented or at least damped owing to the provided device 3. This prevents the information carrier 4 striking adjacent devices and avoids noise. Moreover, this has a favorable effect on fault-free and precise reading of the information.

Since the presented method can use any number of devices 3 in practice, it is possible to use it even with large building heights and thus large heights 84 of the elevator shaft 6.

The invention is not limited to the described exemplary embodiments and designs. For instance, the clamping element 16 can also be in the form of a spring or tension spring, which is connected to the information carrier 4 directly or indirectly by means of the clamping force transmission means 17 at one end and to the connection piece 18 at the other end. The connecting parts are then designed such that the spring pulls the information carrier 4 to the retaining element 15.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A vibration stabilizer device for retaining an information carrier extending through an elevator shaft of an elevator system, the device comprising:

a retaining element in a stationary position in the elevator shaft;

a clamping element connected to the information carrier at a point of the information carrier, wherein the clamping element is adapted to be tensioned to load the information carrier with a clamping force against at least one contact region provided on the retaining element; and wherein the clamping element is connected to the information carrier by a clamping force transmission means.

2. The device according to claim 1 wherein the clamping force transmission means is a tensioning wire.

3. The device according to claim 1 wherein the clamping force transmission means is guided through a through-opening formed in the information carrier, and a head is formed at one end of the clamping force transmission means, wherein the clamping force transmission means is connected to the information carrier by the head at the point in response to the clamping force.

4. The device according to claim 1 wherein the at least one contact region of the retaining element includes a first contact region and a second contact region, the retaining element having a through-opening through which the clamping force transmission means runs from the clamping element on one side to the information carrier on another side, the through-opening being positioned between the first contact region and the second contact region, and wherein the through-opening allows a vertical displacement of the information carrier relative to the retaining element.

5. The device according to claim 1 wherein the retaining element has a first lateral retaining bar and a second lateral retaining bar, and the information carrier is arranged between the first lateral retaining bar and the second lateral retaining bar when the information carrier bears against the at least one contact region.

6. The device according to claim 5 wherein the retaining element has a through-opening through which the clamping force transmission means runs from the clamping element on one side to the information carrier on another side, and the through-opening is positioned between the first lateral retaining bar and the second lateral retaining bar.

7. The device according to claim 1 wherein the clamping element is adapted to permit the information carrier to be lifted off from the at least one contact region against the clamping force by a detection device used to detect information stored on the information carrier.

8. The device according to claim 1 wherein the clamping element is formed as a clamping bracket, and wherein the clamping force transmission means is connected to the clamping bracket whereby a minimum effective value of the clamping force is set by a length of the clamping force transmission means between the information carrier and the clamping bracket.

9. The device according to claim 8 including a connection piece connecting the clamping bracket to the retaining element.

10. The device according to claim 9 including at least one fastening clip adapted to be fastened to a rail of the elevator system, and a supporting arm connecting the connection piece to the at least one fastening clip to fasten the device to the rail.

11. A shaft information system for an elevator system having an elevator car comprising:

an information carrier;

a detection device connected to the elevator car and being adapted to detect information stored on the information carrier; and at least one of the vibration stabilizer device according to claim 1 retaining the information carrier.

12. The shaft information system according to claim 11 wherein the detection device has a guiding structure adapted to lift off the information carrier from the at least one contact region of the retaining element when the detection device is guided along the information carrier in a region of the retaining element during operation of the elevator car, wherein the guiding structure has a cut-out facing the retaining element, and wherein the guiding structure has two side pieces that are pivotable relative to each other and are connected to each other via a back that is bendable at least at one point or overall.

13. The shaft information system according to claim 11 wherein the detection device has a guiding structure adapted to lift off the information carrier from the at least one contact region of the retaining element when the detection device is guided along the information carrier in a region of the retaining element during operation of the elevator car, wherein the guiding structure has a cut-out facing the retaining element, and wherein the guiding structure has two separate side pieces that bear end to end against each other on a rear of the guiding structure when the side pieces are inserted into a receptacle in the detection device.

14. The shaft information system according to claim 11 wherein the detection device has a guiding structure adapted to lift off the information carrier from the at least one contact region of the retaining element when the detection device is guided along the information carrier in a region of the retaining element during operation of the elevator car, wherein the guiding structure has a cut-out facing the retaining element, and wherein the guiding structure has two separate side pieces that are inserted into a receptacle in the detection device separately from each other and in an interlocking manner.

15. A method for preventing vibrations of an information carrier extending through an elevator shaft of an elevator system, the method comprising the steps of:

installing at least one of the vibration stabilizer device according to claim 1 in the elevator shaft; and retaining the information carrier by the at least one vibration stabilizer device at the point of the information carrier.

16. A method for mounting a vibration stabilizer device according to claim 1 in an elevator system having an information carrier extending through an elevator shaft of the elevator system, the method comprising the following steps:

mounting the retaining element in a stationary position in the elevator shaft;

connecting the clamping element to the information carrier with the clamping force transmission means at the point of the information carrier; and tensioning the clamping element to load the information carrier with the clamping force via the clamping force transmission means against the at least one contact region provided on the retaining element.

17. A vibration stabilizer device for retaining an information carrier extending through an elevator shaft of an elevator system, the device comprising:

a retaining element in a stationary position in the elevator shaft and having at least one contact region; and a magnetic element at the retaining element, wherein the information carrier has a point that is permanently magnetized or can be magnetized by the magnetic element, and wherein the information carrier is loaded by a magnetic force of the magnetic element against the at least one contact region.

* * * * *